United States Patent [19]
Chandler

[11] Patent Number: 5,664,605
[45] Date of Patent: Sep. 9, 1997

[54] LINING MATERIALS CONTAINING CURABLE RESINS

[75] Inventor: Brian Burnett Chandler, Steinermark, Austria

[73] Assignee: Sound Pipe, Ltd., Grand Turk, Turks/Caicos Islands

[21] Appl. No.: 553,864

[22] Filed: Nov. 6, 1995

[30] Foreign Application Priority Data

Mar. 18, 1995 [GB] United Kingdom ............. 9505489

[51] Int. Cl.⁶ .................... F16L 55/165; B29C 63/34
[52] U.S. Cl. ............... 138/97; 264/442; 264/494; 264/155; 264/156; 264/269; 264/28; 264/516
[58] Field of Search .................. 138/97, 98; 264/36, 264/269, 516, 407, 442, 28, 494, 154, 155, 156; 156/94, 287, 294

[56] References Cited

U.S. PATENT DOCUMENTS

| | | | |
|---|---|---|---|
| 2,794,758 | 6/1957 | Harper et al. | 156/287 |
| 3,132,062 | 5/1964 | Lang et al. | 156/294 |
| 3,494,813 | 2/1970 | Lawrence et al. | 156/294 |
| 3,927,164 | 12/1975 | Shimabukuro | 156/294 |
| 4,776,370 | 10/1988 | Long, Jr. | 138/98 |
| 5,223,204 | 6/1993 | Endoh | 264/516 |
| 5,407,630 | 4/1995 | Smith | 264/269 |
| 5,409,561 | 4/1995 | Wood | 264/269 |

FOREIGN PATENT DOCUMENTS

| | | | |
|---|---|---|---|
| 0 065 886 | 12/1982 | European Pat. Off. | |
| 0 377 486 | 7/1990 | European Pat. Off. | |
| 61-283531 | 12/1986 | Japan. | |
| 4-147834 | 5/1992 | Japan | 264/36 |
| WO94/23934 | 10/1994 | WIPO. | |
| WO95/10006 | 4/1995 | WIPO. | |
| WO95/20125 | 7/1995 | WIPO. | |

*Primary Examiner*—Mathieu D. Vargot
*Attorney, Agent, or Firm*—Cowan, Liebowitz & Latman, P.C.; Michael I. Wolfson

[57] ABSTRACT

Lining tube material including a curable latent resin system for lining underground pipelines and passageways is prepared as a large supply. Measured lengths are taken from the supply as needed by measuring the length (for a particular length of passageway to be lined) followed by curing the resin of the material along a short section between the length and the remainder of the supply, and by cutting through the cured section to sever the length from the remainder of the supply leaving a cured and sealing end portion on said length by which the insertion of the length in the pipeline or passageway can be controlled.

10 Claims, 2 Drawing Sheets

LINING MATERIALS CONTAINING CURABLE RESINS

BACKGROUND OF THE INVENTION

This invention relates to lining materials containing curable resins, being materials in the form of tubular structures which are for use in connection with the lining of pipelines and passageways, especially underground sewers and the like.

The use of lining tubes which are resin impregnated, for lining sewers is now well known, the basic technology being disclosed in U.S. Pat. Nos. 4,009,063 and 4,064,211. These patent specifications disclose the nature of the processes and materials used in applying resin impregnated linings to underground pipelines and passageways. Basically, a tube of resin absorbent material is thoroughly impregnated with the resin, and whilst the tube so impregnated and is still flexible, it is urged against the pipeline or passageway surface to be lined, and then the resin is cured whereby a hard resin lining pipe having the absorbent material embedded therein is formed on the pipeline or passageway surface, completing the rehabilitation of same.

These methods, which are referred to sometimes as "cured in place" methods are practised widely throughout the world, and the processes are extremely successful.

There have been developments recently however to improve the processes and the materials, and such developments comprise the provision of resin systems which are quiescent or latent insofar as the resin which is used for the lining tubes will remain uncured for a long period of time, but can be cured selectively by the application of appropriate means, typically radiation, such as ultra sonic radiation, microwave radiation, light radiation or even heat radiation. The reason for producing latent resin systems for use in these processes is to enable the production of the lining materials at a substantial period of time before the materials are actually to be used in the lining operation. This means that the linings including the resin can be manufactured and stored and will eventually be orderable from a stock of the materials for each particular contract.

The present invention concerns mainly those lining tubes which include latent resin systems (although it can be applied where non-latent conventional and other resin systems are used), and where a large length of the lining material forms a stock, and sections can be cut off therefrom for particular jobs.

Recent developments related to the materials have provided that the layer of the tube which includes the resin is an extrudate of the resin mixed with reinforcing material such as fibres. The extrudate may be sandwiched between films or coatings in such lining tubes there is no layer which is "impregnated" with the resin but rather the resin mixture is a tactile mass which forms a curable layer.

When a lining structure is fabricated for a particular contract, the lining tube will be manufactured to the appropriate length, and is provided with appropriate end formations whereby the end of the lining bag is closed, to retain the resin therein, and is also provided with appropriate fastening devices to enable for example ropes to be connected thereto, whereby the lining material can be pulled into the pipeline or passageway to be lined, or, where it is everted into the pipeline or passageway, its progress can be controlled. In general therefore, the ends of the lining material are closed, and it is usual to provide special closure ends for the lining material.

OBJECTIVES OF THE INVENTION

The present invention is concerned with providing closure ends in a simple and effective manner on lengths of cured in place lining materials which include synthetic resin, and which are taken from a stock of such material on an as needed basis.

Another objective of the invention is to provide tubular lining lengths which have effective and simplified end formations.

Yet a further objective is to provide sealed and latent cure resin layer linings which can be easily handled and used.

SUMMARY OF THE INVENTION

In accordance with the present invention, a length of tubular lining material including curable resin is taken from a stock of such material by measuring the required length, and then by curing the resin over a section of the lining material joining that length to the remainder, whereby the length to be removed can be severed by severing through the cured portion, so that the cured material at the end of the length forms a closed end.

In curing the said section of material, preferably it is cured in a size smaller than the overall width of the remainder of the material which is uncured, to ensure that the cured end can pass through the pipeline or passageway which is to be lined with the length of material.

In this connection, the section which is cured may be folded into horseshoe configuration before being cured.

In order to prevent curing of the resin in the remainder of the stock of material, and the length which is removed from the stock, appropriate isolation means may be provided at the end of the cured section. Such isolation means may comprise devices to chill the resin at these ends, or clamps to isolate the remainder of the resin from the cured section.

The resin which is utilized in the lining material preferably is of the latent type which requires the application of appropriate radiation or energy in order to cure same. Preferably, the resin is one which will react in a curing sense to ultrasonic energy, and an ultrasonic generator is used to cure the section which will form the lining ends.

When the cured section is severed, one part of the cured section will remain with the stock of material forming a closed end for the next length to be removed therefrom, whilst the other portion of the cured section will form a closed end for the length which is removed.

A simple and effective method is therefore provided for the extraction of lengths of lining material from stock of such material. Obviously, the length which is removed from the stock will be of the appropriate length for the pipeline or passageway to be lined thereby.

The curing can be effected by any means such as by heat or light radiation, but in any event it should be such as to effect only cure of the required section, as curing of the majority of the length which is removed has to be effected when the lining is placed inside the pipeline or passageway and is inflated to the surface thereof by fluid pressure.

BRIEF DESCRIPTION OF THE DRAWINGS

An embodiment of the present invention will now be described, by way of example, with reference to the accompanying diagrammatic drawings, wherein.

DETAILED DESCRIPTION OF THE INVENTION

Figure 1:
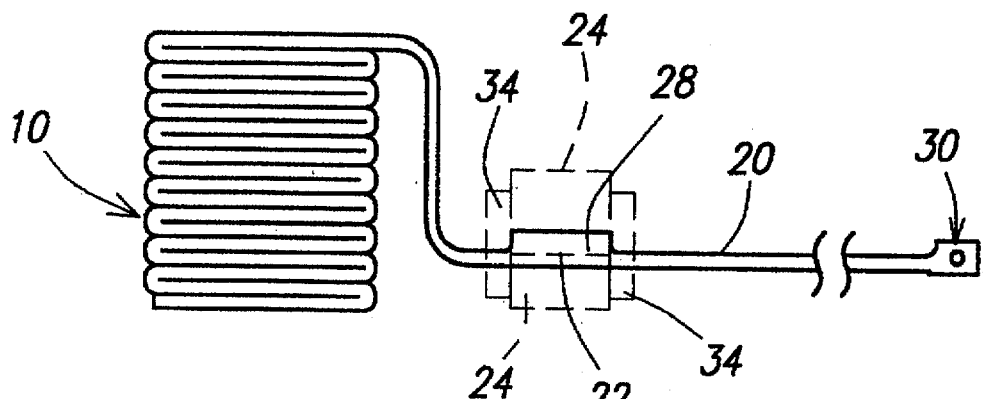
FIG. 1 is a view showing a stock of tubular lining material including curable resin and showing how the lining material is taken from the stock, and the step of curing a section of the material to define a length to be removed from the stock.
Figure 2:
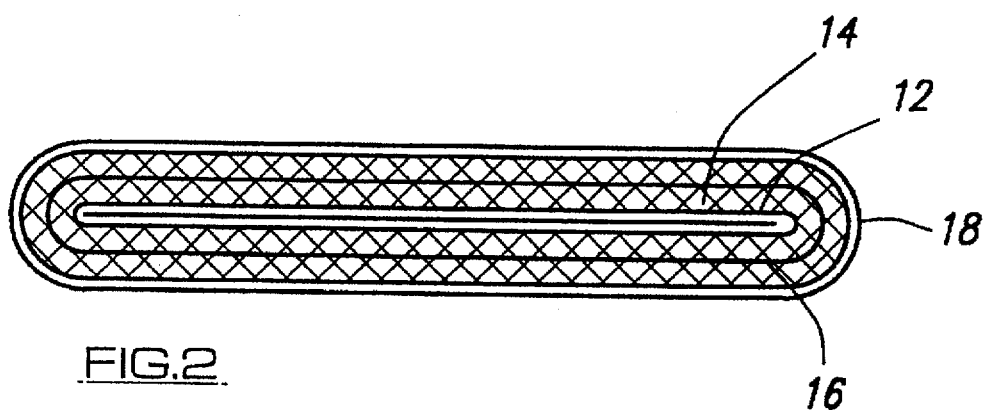
FIG. 2 is an enlarged sectional elevation showing the nature of the layers of the particular lining material of FIG. 1.

Referring to the drawings, and firstly to FIG. 1, a stock of tubular lining material including curable resin is indicated by reference numeral 10, and this material is stored in a warehouse or factory or the like ready for use when it is required to cut a length of the material from the stock for the lining of an underground pipeline or passageway. In this example, the material 10 is shown as comprising an inner plastic membrane 12, a layer of resin impregnated felt 14 which is integral with the layer 12, a second layer of the felt material 16 which is integral with an outer plastic film or coating 18. The felt materials are impregnated with the synthetic resin, which is of the latent type insofar as it will not cure until activated by some external means of a type hereinbefore referred to.

Figure 3:
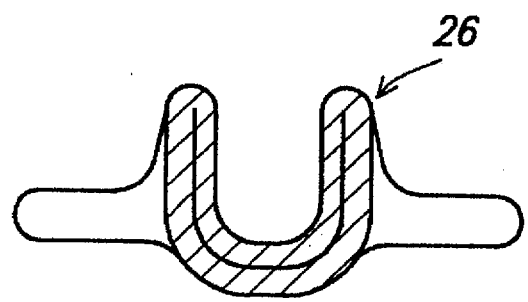
FIG. 3 is a sectional elevation showing how the cured portion is shaped into horseshoe configuration for curing.
Figure 4:
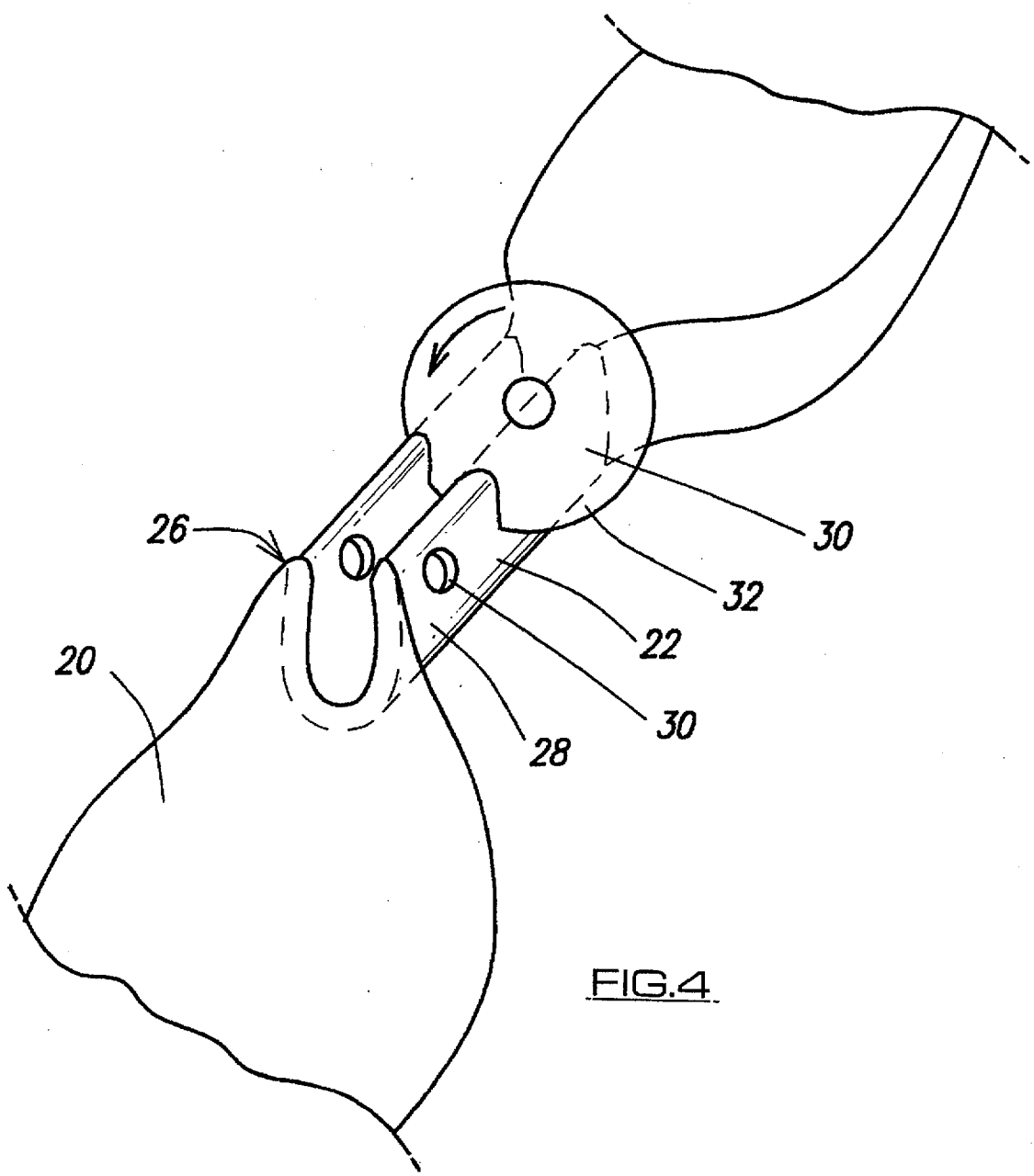
FIG. 4 shows how the length of impregnated material is removed from stock, and is provided with an aperture for the receipt of a rope or the like for pulling same or controlling the movement of same into a pipeline or passageway.

When it is required to remove a length 20 from the stock of material 10, the length 20 is fed out from the stock as shown in FIG. 1, and then a section 22 only is cured by the appropriate application of curing energy by a means 24. The means 24 in this case may typically be an ultrasonic generator, and the resin system is preferably such as to be curable by the application of ultrasonic energy. When curing of the section 22 takes place, it is preferable that this section be folded into the horseshoe configuration shown at 26 in FIG. 3 so that the resulting cured section, which forms an end 28 on the length 20 of material which has been removed can pass into the pipeline or passageway which is to be lined. In other words its overall diametrical size must be smaller than the diameter of the pipeline or passageway in which it is to be used. The section 22 can be severed through the middle by any suitable means such as a disc saw 32 to create the end 28 on the removed length 20 and the end 30 on the stock 10.

By a simple means therefore, the length of lining material is provided with a rigid closed end 28, which can be provided with an aperture 30 by means of a boring tool, to receive a rope which can be used for pulling or controlling the feed of the lining material into the pipeline or passageway.

The leading end 30 of the length of lining material may have a previously formed cured, closed end formed by a process carried out in relation to the removal of the previous length of lining material from the stock.

When curing the section 22, it may be desirable to isolate the adjacent the lining material which are impregnated and which are not required to be cured at this time. This isolation may be effected by means of clamps 34, or by refrigeration isolation 34 or by any other suitable means.

When the length of lining material is to be used for lining a pipeline or passageway, it can be either pulled into the pipeline or passageway, or can be everted into the pipeline or passageway, and in either case one or both of the precured end portions 28,30 may be removed. After curing the lining material in place on the pipeline or passageway, any remaining cured end portion will be removed by conventional means in order to complete the lining operation.

I claim:

1. A method of preparing a length of tubular lining material including curable resin comprising the steps of a) providing a supply of said tubular lining material having first and second ends;

b) measuring said length of the material from one of said ends to define a location between said first and second ends for cutting the material;

c) curing the resin in a section of the lining about said location only; and d) cutting through the cured material at said location to sever the said length from the supply.

2. The method of claim 1, comprising the step of drilling a hole in said portion of said cured section for receipt of a rope means to control the movement of the length of tubular lining into the pipeline or passageway.

3. The method of claim 1, further comprising the step, during the curing of said section, of isolating the lining material to opposite sides of said location to prevent curing of said resin other than at said location.

4. The method according to claim 3, wherein the isolation step is carried out using isolation clamps.

5. The method according to claim 3, wherein the isolation step is carried out using refrigeration.

6. The method according to claim 1, including the step of forming said section into a U-shape before curing.

7. The method according to claim 1 wherein the tubular lining material comprises a resin matrix layer including reinforcing fibres.

8. The method according to claim 1 wherein the tubular lining material comprises a layer of resin impregnated material.

9. The method according to claim 1, including the step of curing the said section by means of ultrasonic energy.

10. A length of tubular lining material prepared according to the method of claim 1.

* * * * *